US010762902B2

(12) United States Patent
Garikapati et al.

(10) Patent No.: US 10,762,902 B2
(45) Date of Patent: Sep. 1, 2020

(54) METHOD AND APPARATUS FOR SYNTHESIZING ADAPTIVE DATA VISUALIZATIONS

(71) Applicant: CISCO TECHNOLOGY, INC., San Jose, CA (US)

(72) Inventors: Madhuri Garikapati, Sunnyvale, CA (US); Eric Loyd Kroll, San Jose, CA (US); Manikandan Kesavan, Campbell, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 82 days.

(21) Appl. No.: 16/186,019

(22) Filed: Nov. 9, 2018

(65) Prior Publication Data
US 2019/0378506 A1 Dec. 12, 2019

Related U.S. Application Data

(60) Provisional application No. 62/682,718, filed on Jun. 8, 2018.

(51) Int. Cl.
*G10L 15/22* (2006.01)
*G06F 3/16* (2006.01)
(Continued)

(52) U.S. Cl.
CPC ............ *G10L 15/22* (2013.01); *G06F 3/0484* (2013.01); *G06F 3/167* (2013.01); *G10L 15/16* (2013.01);
(Continued)

(58) Field of Classification Search
CPC ... G10L 15/22; G10L 15/00; G10L 2015/225; G10L 21/10; G10L 2015/228;
(Continued)

(56) References Cited

U.S. PATENT DOCUMENTS 8,625,756 B1 * 1/2014 Lavian .................. H04M 3/493
379/93.17
8,903,073 B2 * 12/2014 Or-Bach ............... H04M 3/493
379/218.01

(Continued)

OTHER PUBLICATIONS

Dibia, "Data2Vis: Automatic Generation of Data Visualizations Using Sequence to Sequence Recurrent Neural Networks", arXiv:1804.0312v2 [cs.HC] Apr. 19, 2018, 1-10 pages.

(Continued)

*Primary Examiner* — Vijay B Chawan
(74) *Attorney, Agent, or Firm* — Johnson, Marcou, Isaacs & Nix, LLC

(57) ABSTRACT

A system to dynamically update presentations based on context classification of voice inputs, comprising: a storage device and a processor communicatively coupled to the storage device, wherein the processor executes application code instructions that are stored in the storage device to cause the system to: display a first graphical user interface associated with a first context via a user interface, obtain a first voice input, determine one or more first terms from the first voice input, determine that the first voice input is related to a first context based on the one or more first terms, and in response to determining that the first voice input is related to the first context: modify the first graphical user interface associated with the first context and display the modified first graphical user interface associated with the first context via the user interface.

20 Claims, 9 Drawing Sheets

(51) Int. Cl.
*G10L 15/18* (2013.01)
*G10L 15/16* (2006.01)
*G06F 3/0484* (2013.01)

(52) U.S. Cl.
CPC .... *G10L 15/1815* (2013.01); *G10L 2015/223* (2013.01)

(58) Field of Classification Search
CPC .... G06F 3/0484; G06F 3/167; G06F 16/2425; G06F 16/2428; G06F 16/248; G06F 16/26; G06N 21/60; G06N 7/15
USPC ..... 704/270.1, 275, 251, 231; 370/352, 401, 370/329; 705/14.4; 707/722, 728
See application file for complete search history.

(56) References Cited

U.S. PATENT DOCUMENTS

| | | | | |
|---|---|---|---|---|
| 9,001,819 | B1* | 4/2015 | Or-Bach | H04L 65/4015 370/352 |
| 9,990,177 | B2* | 6/2018 | Faaborg | G10L 15/00 |
| 10,133,928 | B2* | 11/2018 | Malitz | G06K 9/0063 |
| 10,516,980 | B2* | 12/2019 | Vigeant | H04W 4/025 |
| 2003/0144846 | A1* | 7/2003 | Denenberg | G10L 15/22 704/277 |
| 2014/0330821 | A1* | 11/2014 | Tullis | G06F 16/2428 707/728 |
| 2016/0012276 | A1* | 1/2016 | Malitz | G06K 9/00651 382/113 |
| 2016/0335052 | A1* | 11/2016 | Faaborg | G10L 15/22 |

OTHER PUBLICATIONS

"Dialogflow. Build natural and rich conversatio . . . experiences", https://diaglogflow.com, 5 pages (May 30, 2018).
"Eviza: A Natural Language Interface for Visual Analysis", https://research.tableau.com/paper/eviza-natural-language-interface-visual-analysis, 2 pages, (Oct. 16, 2016).
"Graphic—Knowledge Delivered", https://www.graphiq.com, 5 pages, (May 30, 2018).
"MindMeld—Advanced AI to Power Conversational Interfaces", About Cisco (http://www.cisco.com/c/en/us/about.html) 7 pages, (May 30, 2018).
Luu, "Hands-Free Analytics in Real-Time with Amazon Alexa", https://www.zoomdata.com/blog/hands-free-analytics-real-time-amazon-alexa/, 7 pages (Dec. 4, 2017).

* cited by examiner

700

800

Point level sequence pattern 810

Union level sequence pattern with no break in context 820

Union level sequence pattern with break in context 830

METHOD AND APPARATUS FOR SYNTHESIZING ADAPTIVE DATA VISUALIZATIONS

CROSS-REFERENCE TO RELATED APPLICATION

This patent application claims priority to U.S. Provisional Patent Application No. 62/682,718, filed Jun. 8, 2018 and entitled "Method and Apparatus for Synthesizing Adaptive Data Visualizations." The entire disclosure of the above-identified priority application is hereby fully incorporated herein by reference.

TECHNICAL FIELD

The technology disclosed herein relates to optimizing presentations on a user interface based on context determination.

BACKGROUND

A rapidly increasing need for data driven decisions is driving users to embrace Business Intelligence (BI) tools to visualize and explore data. Yet most BI tools and dashboards fail to reach their intended outcome and therefore lack user adoption. For example, predefined presentations, workflows and dashboards are static and decision makers cannot find answers to questions that are not already built into the original content and workflow of the predefined content. Also, dashboards contain either too much or too little information. Consequently, users are either overwhelmed or under informed. Further, existing visualization and presentation practices assume a learning curve and users are expected to know how the information hierarchy is laid out before they can effectively navigate to the user's point of interest. Conventional presentations are generally static with slides that are fixed.

In conventional technology, data visualizations, for example, interactive computer slide presentations, need to be prebuilt by a content creator. Accordingly, conventional data visualizations cannot answer a question that is not already anticipated and prebuilt into the data visualizations. Moreover, they do not provide the capability to ask follow-up questions with reference to a graph for further drilldown or recommend a next best question to ask of the data. Conventional technology provides capabilities to decipher intent from a user request or other user input and then provide an output such as initiating a conversation with an application to complete tasks based on the user input such as ordering a pizza, booking a taxi, etc. However, conventional technology does not provide the capability to anticipate the next best question a user can ask. While conventional technology provides an ability to determine a context of a user query and to extend a context lifespan when interpreting user queries, conventional technology requires the context determination to be parameterized and context determination cannot be done dynamically. Additionally, none of these tools of conventional technology have a way to render interactive data visualizations dynamically to fit data requested by the user during presentation of the interactive data visualizations.

A system that allows adaptive, on demand, and intuitive contextual navigation of visual content is a new and useful change to existing data visualization and presentation practices. It serves as a natural fit to people's decision making compared to predefined dashboards, templates, and spreadsheets.

DETAILED DESCRIPTION OF THE EXAMPLES

Overview

Figure 1:
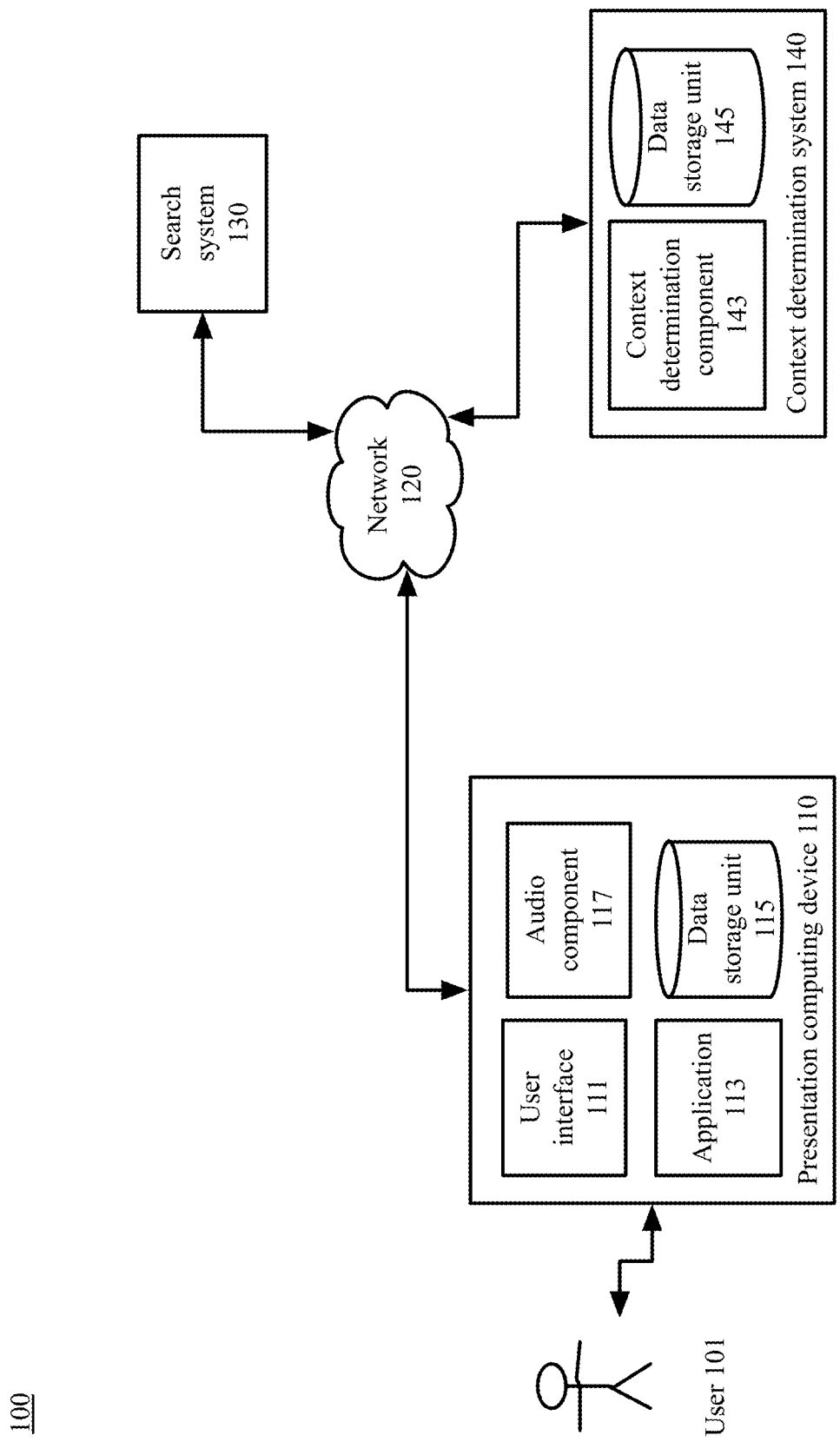
FIG. 1 is a block diagram describing an example system to detect user intent and modify presentations via a presentation computing device, in accordance with certain examples.

Examples herein provide computer-implemented techniques to detect user intent and generate visualizations via a presentation computing device. In an example, a system for detecting user intent and generating a graph visualization comprises a dynamic recursive context, a next best visualization, and a graph classifier. The word "intent" is being used in the context of Machine Learning/Deep Learning and it should be interpreted as a sequence of digital tokens to label classified data.

In an example, a user creates a presentation using a presentation computing device. The user conducts the presentation via the presentation computing device. The presentation computing device receives audio and video input from an environment of the presentation computing device during the presentation. The presentation computing device detects a query from the received input. The presentation computing device determines a current context for the query. The presentation computing device modifies a display of the presentation based on the query and the current context. In some examples, the presentation computing device does not detect a subsequent query from received input and the user completes the presentation. In other examples, the presentation computing device detects a subsequent query from received input and then determines whether the subsequent query is relevant to the current context. In some examples, the presentation computing device determines that the subsequent query is relevant to the current context and modifies a display of the presentation based on the subsequent query and the current context. In other examples, the presentation computing device determines that the subsequent query is not relevant to the current context and then determines whether the subsequent query is relevant to a prior context. In some examples, the presentation computing device determines that the subsequent query is relevant to a particular prior context, sets the particular prior context as being the current context, and modifies a display of the presentation based on the subsequent query and the current context. In other examples, the presentation computing device determines that the subsequent query is not relevant to any prior context, determines a new context from the subsequent query, sets the new context as being the current context, and modifies a display of the presentation based on the current context. In some examples, the presentation computing device determines whether a subsequent question is received via input of the presentation computing device, determines a context category for the subsequent query, sets the context of the subsequent query to a current context, and then modifies a display of the presentation based on the current context.

In certain examples, the presentation computing device utilizes a graph classifier that applies an algorithm involving generative models that are composed of encoder-decoder layers of recurrent neural networks (RNNs). The presentation computing device applies generative models to help decide what chart to use, evolving as the data evolves in volume and in dimensionality, and adding layers on existing visualization to help make sense of data. In certain examples, the presentation computing device, using the generative models determines, during a presentation, that a region of a displayed graph is statistically significant and displays, in response to that determination, a close up view of the statistically significant portion of the graph as an overlay over the current presentation slide displaying the graph. In an example, the generative models are based on data from a specific user, from aggregated data of multiple users, or from a combination of data from both a specific user and aggregated data of multiple users. In some examples, in response to receiving a voice input, the presentation computing device determines that the user is looking for additional information concerning a context. The presentation computing device generates a search query and transmits the search query to a search system via a network and receives search results via the network from the search system in response to the search query. The search system retrieves one or more search results in response to receiving the search query via the network and transmits the retrieved one or more search results to the presentation computing device via the network. The presentation computing device selects one or more images, text, videos, or other data from the one or more received search results and annotates the presentation with the one or more selected data.

In certain examples, after a subsequent question is detected by the presentation computing device, the presentation computing device determines a next best question. For example, the presentation computing device comprises an algorithm that incorporates a Convolutional Neural Network (CNN) to learn sequential features, and Latent Factor Model (LFM) to learn user specific features. To train the CNN, for each user (u), the presentation computing device extracts every L successive questions as input and. their next T questions as the targets from the user's sequence S. This is done by sliding a window of size L+T over the user's sequence, and each window generates a training instance for u denoted by a triplet (u, previous L questions, next T questions). This approach enables the use of convolution filters to search for sequential patterns. Borrows the idea of using CNN in text classification, the approach regards the Lxd matrix E as the "image" of the previous L items in the latent space and regard sequential patterns as local features of this "image". In an example, Next Best Question recommends N items that have the highest values in the output layer y. In an example, the CNN learns from data from a specific user associated with a particular presentation computing device. In another example, the CNN learns from aggregated data of multiple users associated with respective presentation computing devices 130. In yet another example, the CNN learns from data both from a specific user and from the aggregated data of multiple users. In certain examples, in response to detecting a question via input to the presentation computing device, the presentation computing device requests a next best question from the context determination system via the network, the context determination system determines a next best question based on the detected question as described herein, and the context determination system transmits the determined next best question to the presentation computing device via the network.

By using and relying on the methods and systems described herein, the presentation computing device improves the way the data is processed to address a complex combinatorial problem. The existing practices of executive meetings or briefings such as investment planning, service reviews, strategic decision making primarily rely on static content such as slides, spreadsheets and dashboards. The downside to these formats is that they cannot be changed on the fly to answer unexpected questions that come up during discussion. This requires offline information gathering and analysis in order to close the loop. The method described provides a different approach as compared to traditional practices and generates dynamic, on demand data visualizations that are much more intuitive and support the decision making process in a natural way where the content and the sequence of the data changes based on the information needed at any given moment. The system improves computer functionality by improving the way the data is processed to address the complex combinatorial problem of dynamically modifying a presentation based on context.

Turning now to the drawings, in which like numerals represent like (but not necessarily identical) elements throughout the figures, examples are described in detail.

Example System Architectures

FIG. 1 is a block diagram describing an example system to detect user intent and generate visualizations via a presentation computing device, in accordance with certain examples.

As depicted in FIG. 1, the example operating environment 100 comprises systems 110, 130, and 140 that are configured to communicate with one another via one or more networks 120 via network computing devices. In another example, two or more of these systems (including systems 110, 130, and 140) are integrated into the same system. In some examples, a user associated with a device must install an application and/or make a feature selection to obtain the benefits of the techniques described herein.

Each network 120 comprises a wired or wireless telecommunication mechanism by which network systems (including systems 110, 130, and 140) can communicate and exchange data. For example, each network 120 can include, be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, Bluetooth Low Energy (BLE), near field communication network (NFC), any form of standardized radio frequency, infrared, sound (for example, audible sounds, melodies, and ultrasound), other short range communication channel, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example, each network system (including systems 110, 130, and 140) comprises a device having a communication module capable of transmitting and receiving data over the network 120. For example, each network system (including systems 110, 130, and 140) may comprise a server, personal computer, mobile device (for example, notebook computer, handheld computer, tablet computer, netbook computer, personal digital assistant (PDA), video game device, GPS locator device, cellular telephone, Smartphone, or other mobile device), a television with one or more processors embedded therein and/or coupled thereto, an appliance with one or more processors embedded therein and/or coupled thereto, or other appropriate technology that comprises or is coupled to a web browser or other application for communicating via the network 140. In the example depicted in FIG. 1, the network systems (including systems 110, 130, and 140) are operated by merchants, users, and product management computing system operators, respectively.

An example presentation computing device 110 comprises a user interface 111, an application 113, a data storage unit 115, and an audio input 117. In an example, the presentation computing device 110 receives voice inputs from one or more users 101 and displays presentations for the user 101 via the user interface 111.

An example application 113 is a program, function, routine, applet or similar entity that exists on and performs its operations on the presentation computing device 110. For example, the application 113 may be a presentation visualization application that enables a user 101 to generate presentations and view previously generated presentations. In some examples, the user 101 must install an application 113 and/or make a feature selection on a presentation computing device 110 to obtain the benefits of the techniques described herein.

An example data storage unit 115 may be a memory unit resident on the presentation computing device 110. An example data storage unit 115 enables storage of item inventory and item prices for retrieval by or communication to the product presentation computing device 110. In an example, the data storage unit 115 can include any local or remote data storage structure accessible to the presentation computing device 110 suitable for storing information. In an example, the data storage unit 115 stores encrypted information, such as HTML5 local storage.

In an example, the audio input 117 component of the user computing device 110 receives one or more voice inputs of the user 101.

In an example, one or both of the presentation computing device 110 and the context determination system 140 communicate with a search system 130 via a network 120 to transmit a search query and receive a response to the search query.

In an example, the presentation computing device 110 communicates with a context determination system 140 via a network 120. In an example, the context determination system comprises a context determination component 143 and a data storage unit 145.

In an example, the context determination component 143 receives a voice input of the user 101 at the presentation computing device 110 via the network 120 and determines whether the voice input is related to a current context, is related to a previous context, or is unrelated to either a current context or to a previous context. In an example, if the context determination component 143 determines that the voice input is related to a current context, the context determination component 143 extends the current context. In an example, if the context determination component 143 determines that the voice input is related to a previous, stored context, the context determination component 143 stores the current context as a previous context and begins a new context. In yet another example, if the context determination component 143 determines that the voice input is unrelated to either a previous, stored context or the current context, the context determination component 143 stores the current context as a previous context and begins a new context. In an example, context determination component 143 transmits, to the presentation computing device 110 via the network 120 information to display via the user interface 111 based on a received user voice input 111 and a current context.

In certain examples, one or more functions of the context determination system 140 or context determination component 143 are performed by the presentation computing device 110 and one or more functions performed by the presentation computing device 110 are performed by the context determination system 140 or by the context determination component 143.

In examples, the network computing devices and any other computing machines associated with the technology presented herein may be any type of computing machine such as, but not limited to, those discussed in more detail with respect to FIG. 10. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 11. The computing machines discussed herein may communicate with one another, as well as with other computing machines or communication systems over one or more networks, such as network 120. The network 120 may comprise any type of data or communications network, including any of the network technology discussed with respect to FIG. 9.

The components of the example operating environment 100 are described hereinafter with reference to the example methods illustrated in FIGS. 2-8. The example methods of FIGS. 2-8 may also be performed with other systems and in other environments. The operations described with respect to any of the FIGS. 2-8 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Example Processes

Figure 2:
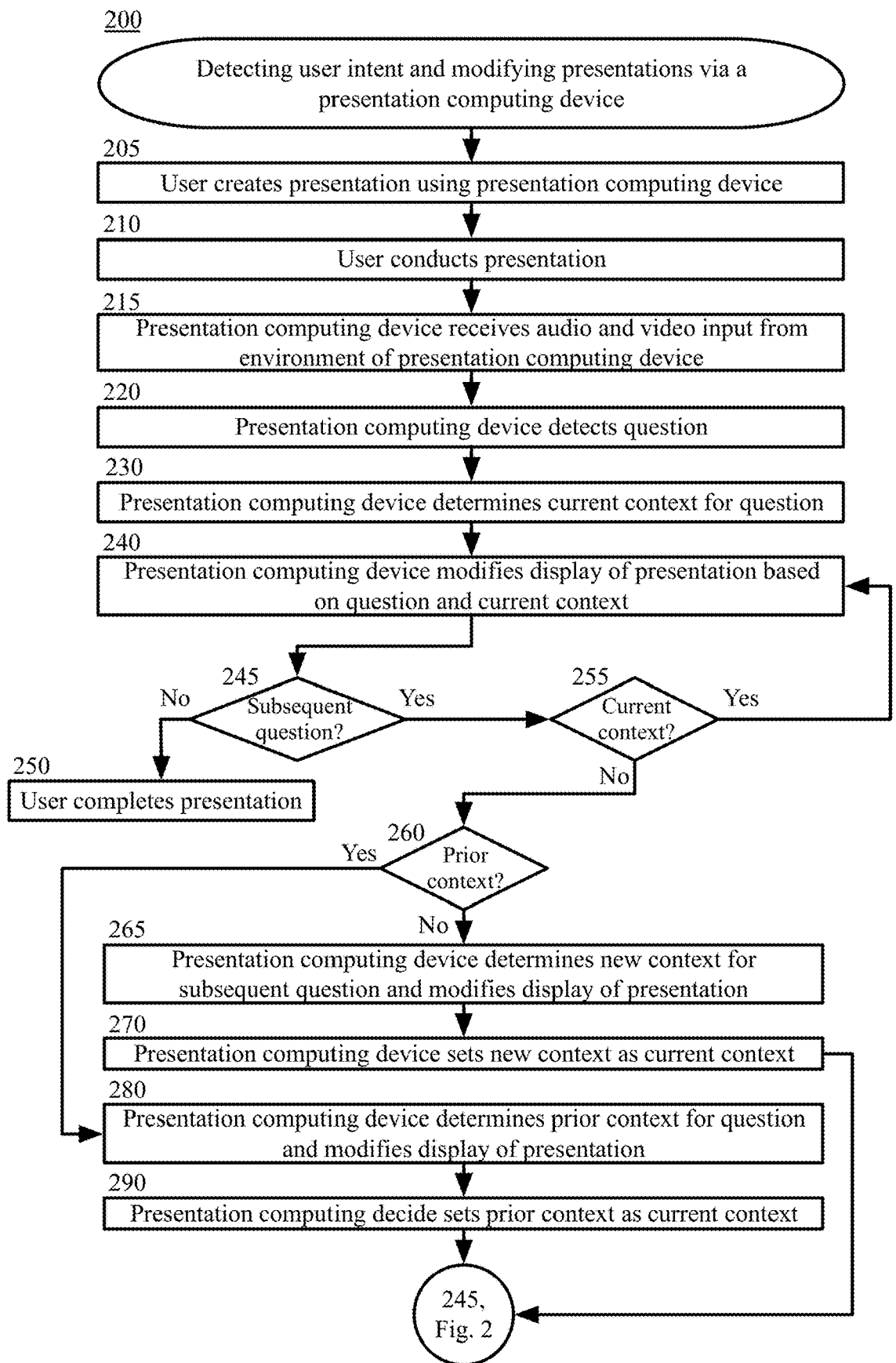
FIG. 2 is a block flow diagram describing a method to detect user intent and modify presentations via a presentation computing device, in accordance with certain examples.

FIG. 2 is a block flow diagram describing a method 200 to detect user intent and modify presentations via a presentation computing device, in accordance with certain examples. The method 200 is described with reference to the components illustrated in FIG. 1. In certain examples, the presentation computing device 110 conducts the steps of method 200 as described herein. In other examples, the context determination system 140 conducts one or more steps described herein as conducted by the presentation computing device 110.

In block 205, a user 101 creates a presentation using a presentation computing device 110. For example, the user 101 selects an application 113 on the presentation computing device 110. In an example, the application 113 comprises a multimedia presentation generator application 113 and the user 101 creates a presentation via the application 113 by selecting one or more user interface 111 objects on the user computing device 110. An example presentation comprises a visual presentation, an audio presentation, an audio-visual presentation, or other presentation that can be displayed via the user interface 111 of the presentation computing device 110. In an example, the presentation may comprise one or more visual slides, one or more audio clips, one or more video clips, one or more animations, one or more graphs, one or more text objects, and/or other appropriate content that may be presented via the user interface 111 of the user computing device 110. An example presentation comprises a theme and then a series of content related to the theme. In another example, the user 101 creates the presentation via another computing device other than the presentation computing device 110. In this other example, the user 101 transmits the presentation created via the other computing device to the presentation computing device 110. In yet another example, another user 101 creates the presentation and the user 101 downloads the presentation generated by the other user 101 onto the presentation computing device 110.

In block 210, the user 101 conducts the presentation via the presentation computing device 110. In an example, the user 101 selects one or more user interface 111 objects on the user interface 111 of the presentation computing device 110 to access the presentation via the application 113. In an example, the user 101 conducts the presentation by selecting one or more objects on the user interface 111 of the presentation computing device 110 to present the presentation. In another example, the user 101 conducts the presentation by clicking a mouse or entering inputs to the presentation computing device 110 via a mouse or keyboard communicatively coupled to the presentation computing device 110. For example, the user 101 advances through successive slides in a visual presentation by inputting one or more commands to the presentation computing device 110. In certain examples, the user 101 may input one or more commands to the presentation computing device 110 to cause the presentation computing device 110 to output a video or audio clip as part of the presentation. In certain examples, the user 101 may input one or more commands to the presentation computing device 110 to cause the presentation computing device 110 to advance forward or backward in the presentation. For example, the user 101 may input a command to transition to the next slide or to transition to the previous slide in the presentation. In an example, the presentation computing device 110 displays the presentation via the user interface 111 to an audience and the user 101 while the user 101 is conducting the presentation.

In block 215, the presentation computing device 110 receives audio and/or video input from an environment of the presentation computing device 110 during the presentation. In an example, in response to the user 101 selecting the presentation via the application 113 of the presentation computing device 110, the presentation computing device 110 activates an audio component of the presentation computing device 110 to receive sound inputs from an environment of the presentation computing device 110. For example, in response to receiving a selection of the presentation, the presentation computing device 110 displays the presentation via the user interface 111 and activates a microphone component of the presentation computing device 110 to receive an audio feed of the environment of the presentation computing device 110. The microphone component is a component of the presentation computing device 110 or is otherwise communicatively coupled to the presentation computing device 110. In another example, in response to the user 101 selecting the presentation via the application 113 of the presentation computing device 110, the presentation computing device 110 activates a camera component of the presentation computing device 110 to receive video or image inputs from an environment of the presentation computing device 110. In this other example, in response to receiving a selection of the presentation, the presentation computing device 110 displays the presentation via the user interface 111 and activates a camera component of the presentation computing device 110. The camera component is a component of the presentation computing device 110 or is otherwise communicatively coupled to the presentation computing device 110. In yet another example, in response to the user 101 selecting the presentation via the application 113 of the presentation computing device 110, the presentation computing device 110 activates both a camera component and an audio component of the presentation computing device 110 to receive both sound inputs and video/image inputs from an environment of the presentation computing device 110. In this other example, in response to receiving a selection of the presentation, the presentation computing device 110 displays the presentation via the user interface 111 and activates a microphone component and a camera component of the presentation computing device 110 to receive both an audio feed and a video feed of the environment of the presentation computing device 110. In another example, the presentation computing device 110 transmits an audio feed and/or a video feed input at the presentation computing device 110 to the context determination system 140 via the network 120. In this other example, the context determination system 140 receives the audio feed and/or video feed from the presentation computing device 110 via the network 120.

In block 220, the presentation computing device 110 detects a query from the received input. For example, the presentation computing device 110 displays the presentation via the user interface 111 to an audience and the user 101 while the user 101 is conducting the presentation. While the user 101 is conducting the presentation, one or more members of an audience may provide feedback on the presentation, ask a question concerning the presentation, or otherwise provide a voice input comprising a query that is received by the presentation computing device 110 via the audio feed and/or video feed received by the presentation computing device 110. In an example, the presentation computing device 110 parses the input and applies voice recognition algorithms to determine words and other sounds from the input. In some examples, the presentation computing device 110 applies grammar and syntax rules to determine queries comprising groups of one or more words or sounds that indicate a query is intended.

In another example, the presentation computing device 110 transmits an audio feed and/or a video feed input at the presentation computing device 110 to the context determination system 140 via the network 120, the context determination system 140 detects a query from the received audio feed and/or video feed. In an example, the context determination system 140 parses the received audio feed and/or the received video feed and applies voice recognition algorithms to determine words and other sounds from the received audio feed and/or video feed. In some examples, the context determination system 140 applies grammar and syntax rules to determine queries comprising groups of one or more words or sounds that indicate a query is intended.

In this other example, in addition to transmitting the audio feed and/or the video feed, the presentation computing device 110 transmits data describing the state of the presentation on the presentation computing device 110, for example, the presentation computing device 110 transmits, via the network 120 to the context determination system 140, data describing what is currently displayed via the user interface 111 of the presentation computing device 110. In this other example, the presentation computing device 110 transmits, via the network 120 to the context determination system 140, a file comprising the presentation being currently displayed via the presentation computing device 110. In this other example, the context determination system 140 receives, via the network 120, the data from the presentation computing device 110.

In block 230, the presentation computing device 110 determines a current context for the query. In an example, the presentation computing device 110 determines the current context based on what was displayed at the time the input comprising the query was received at the presentation computing device 110. For example, the subject of a presentation is storms, the presentation is currently displaying a slide about hurricanes, and a sound input comprising a query "what is the wind speed for a category 5?" is received. The presentation computing device 110 detects the received query and determines that the context for the received query is hurricanes based on the displayed slide describing hurricanes. In an example, the presentation computing device 110 determines a full query based on the determined context and the detected query. For example, the presentation is currently displaying a slide about hurricanes and the query "what is the wind speed for a category 5?" is received. The presentation computing device 110 determines a full query comprising "what is the wind speed of a category 5 hurricane?" based on the determined query and the determined context. The presentation computing device 110 determines information responsive to the full query. In an example, the information responsive to the full query comprises information stored on the presentation computing device 110. In another example, the information responsive to the full query is obtained from a storage device accessible via a network 120 by the presentation computing device 110. In yet another example, the presentation computing device 110 submits a determined full query to a search system for information responsive to the full query via the network 120 and receives information via the network 120 from the search system. The search system, in response to receiving the full query, determines information responsive to the full query, and in response to the full query, transmits the responsive information to the presentation computing device 110 via the network 120.

In another example, in which the context determination system 140 detects a query from audio feed and/or video feed received from the presentation computing device 110 via the network 120, the context determination system 140 determines a current context for the detected query. In an example, the context determination system 140 determines the current context based on what was displayed at the time the input comprising the query was received at the presentation computing device 110. For example, the context determination system 140 receives, along with the audio feed and/or video feed from the presentation computing device 110 via the network 120, display data comprising what is currently displayed via the presentation computing device 110. In another example, the context determination system 140 receives, in addition to the display data, a file comprising the presentation being displayed via the presentation computing device 110. Other data may be received by the context determination system 140 via the network 120 from the presentation computing device 110, for example, location data or other data determined or logged by the presentation computing device 110. In an example, the subject of a presentation is storms, the presentation computing device 110 is currently displaying a slide about hurricanes, and a sound input comprising a query "what is the wind speed for a category 5?" is received by the presentation computing device 110 and transmitted by the presentation computing device 110 to the context determination system 140 via the network 120 in an audio feed along with display data comprising the slide currently displayed via the user interface 111 of the presentation computing device 110. The context determination system 140 detects the received query from the received audio feed and determines that the context for the received query is hurricanes based on the displayed slide describing hurricanes. In an example, the context determination system 140 determines a full query based on the determined context and the detected query. For example, the presentation is currently displaying a slide about hurricanes and the query "what is the wind speed for a category 5?" is received. The context determination system 140 determines a full query comprising "what is the wind speed of a category 5 hurricane?" based on the determined query and the determined context. The context determination system 140 determines information responsive to the full query. In an example, the information responsive to the full query comprises information stored on a data storage unit 145 of the context determination system 140. In another example, the information responsive to the full query is obtained from a storage device accessible via a network 120 by the context determination system 140. In yet another example, the context determination system 140 submits a determined full query to a search system 130 for information responsive to the full query via the network 120 and receives information via the network 120 from the search system 130. The search system 130, in response to receiving the full query, determines information responsive to the full query, and in response to the full query, transmits the responsive information to the context determination system 140 via the network 120. The context determination system 140 receives the responsive information via the network 120 and transmits the responsive information to the presentation computing device 110 via the network 120. The presentation computing device 110 receives the responsive information via the network 120 from the context determination system 140. In other examples, the context determination system 140 receives the responsive information via the network 120 from the search system 130 and does not transmit the responsive information to the presentation computing device 110.

In block 240, the presentation computing device 110 modifies a display of the presentation based on the query and the current context. In an example, the presentation computing device 110 displays, via the user interface 111, responsive information to the query retrieved from the presentation computing device 110, retrieved from a storage device accessible to the presentation computing device 110 and/or received from a search system via the network 120. In another example, the context determination system 140 modifies a display of the current presentation and transmits instructions via the network 120 to the presentation computing device 110 instructing the presentation computing device 110 to display, via the user interface 111, responsive information to the query retrieved from the context determination system 140, retrieved from a storage device accessible to the context determination system 140 and/or received by the context determination system 140 from the search system 130 via the network 120.

In another example, the presentation computing device 110 or the context determination system 140 modifies a graphical display of the presentation in response to detecting the query. In an example, the presentation computing device 110 or the context determination system 140 dynamically generates overlaying visualizations for a graph using generative models based on the context of the detected query. In an example, the presentation computing device 110 or context determination system 140 inputs the query and determined context into a graph classifier that uses an algorithm comprising one or more generative models that are composed of encoder-decoder layers of recurrent neural networks (RNNs). The generative models determine which chart to use, evolving as the data evolves in volume and in dimensionality, and adding layers on existing visualization to help make sense of data. For example, generative models are used to generate content that does not exist previously, by learning from previous content displayed by the presentation computing device 110 or other presentation computing devices known to the presentation computing device 110 and/or context determination system 140. In an example, a generative model may generate moving objects comprising a realistic scene or moving scene, for example, generating a bunch of moving cars in an empty road with structures in a city. In another example, the generative model may generate an entire chapter of a book after learning from multiple chapters and books composed by a common author.

In certain examples, the presentation computing device 110 or context determination system 140, using the generative models, determines that a region of a displayed graph is statistically significant and displays or otherwise instructs the presentation computing device 110 to display, in response to that determination, a close up view of the statistically significant portion of the graph as an overlay over the current presentation slide displaying the graph. In an example, the generative models are based on data from a specific user 101, from aggregated data of multiple users 101, or from a combination of data from both a specific user 101 and aggregated data of multiple users 101. For example, the context determination system 140 may aggregate presentation data from multiple presentation computing devices 110 and create the generative models based on the aggregate presentation data. For example, multiple users have given presentations on hurricanes and—based on graphs displayed in the presentations, determined queries based on interactions of the audience with those presentations, determined audience feedback based on interactions of the audience with those presentations, and other appropriate data from concerning those presentations—the context determination system 140 determines how to modify a presentation of a graph.

In an example, conventionally a meteorologist or weather forecaster gives a presentation via a presentation computing device 110, which displays a weather map comprising a comprising a geographical region with some graphs overlaid on top of the primary displayed graph comprising the geographical region. An audience member, for example the news host, asks the meteorologist a question comprising "due to Halloween, there is a parade in street A. How will the weather pattern affect that parade?" Conventionally, the meteorologist uses his marker and manually annotates the user interface 111 of the presentation computing device 110. For example, the meteorologist draws on a pane with circles and arrows and annotates some text on it and announces a response such as "since the winds are moving to the north by 5 PM, the parade is safe." In this same example, however, one or more generative models may be applied to automate this output via the invention described herein. For example, in response to the same voice inputs of the news host and meteorologist, using existing data and learnings from previous annotations, grammar and style of the news host and meteorologist, the presentation computing device 110 and/or context determination system 140 would generate overlay images comprising circles and arrows and also a text answer comprising "winds move north by 5 PM so the parade is safe," which the presentation computing device 110 and/or context determination system 140 may then display via the user interface 111 of the presentation computing device 110 or output as an audio output.

In another scenario in an office boardroom, a presentation computing device 110 displays a chart of the past quarter results for a business. An executive asks a question via a voice input comprising "is that peak in October due to new acquisition?" The presentation computing device 110 and/or the context determination system 140 receives the voice input an detects the question comprising "is that peak in October due to a new acquisition?" The presentation computing device 110 and/or context determination system 140 determines a context and, applying one or more generative models to the context and the detected question, determines that a stacked column chart with revenue divided by acquisition vs. non acquisition makes more sense to understand the data in light of the question presented in the voice input and changes the graph dynamically to display the stacked column chart with revenue divided by acquisition vs. non acquisition. The presentation computing device 110 and/or context determination system 140, applying the one or more generative models to the context and detected question, generates overlay figures comprising circles, bubbles or text to highlight areas in the displayed graph for display via the presentation computing device 110 in response to the voice input.

In block 245, the presentation computing device 110 determines whether a subsequent query is received from the input to the presentation computing device 110. For example, the presentation computing device 110 continues to record or receive an audio feed via the audio component 117 and/or a video feed via a camera device of the presentation computing device 110 as long as the application 113 is open and the presentation is displayed via the user interface 111. In an example, the user 101 selectively activate or deactivate the audio feed and/or video feed by selecting one or more user interface 111 objects on the presentation computing device 110. While the user 101 is conducting the presentation, one or more members of an audience may provide feedback on the presentation, ask a question concerning the presentation, or otherwise provide a voice input comprising a query that is received by the presentation computing device 110 via the audio feed and/or video feed received by the presentation computing device 110. In an example, the presentation computing device 110 parses the input and applies voice recognition algorithms to determine words and other sounds from the input. In some examples, the presentation computing device 110 applies grammar and syntax rules to determine queries comprising groups of one or more words or sounds that indicate a query is intended.

In some examples, the presentation computing device 110 continues to record or receive an audio feed and/or video feed and to transmit the received audio feed and/or video feed to the context determination system 140 via the network 120. In these examples, the context determination system 140 receives the audio feed and/or video feed from the presentation computing device 110 via the network 120. In an example, the context determination system 140 parses the received audio feed and/or video feed and applies voice recognition algorithms to determine words and other sounds from the audio feed and/or video feed. In some examples, the context determination system 140 applies grammar and syntax rules to determine queries comprising groups of one or more words or sounds that indicate a query is intended.

If the presentation computing device 110 does not detect a subsequent query from an input to the presentation computing device 110, the method 200 proceeds to block 250. For example, the presentation computing device 110 continues to receive audio and/or video input but does not detect a query. For example, the audience and/or the user 101 presenting the presentation provide no more sound inputs comprising queries to the presentation computing device 110.

In block 250, the user 101 completes the presentation. For example, the user 101 continues to present the presentation via the presentation computing device 110 until the presentation is completed. For example, the presentation comprises a series of slides, audio content, visual content, graphical content, or other appropriate content.

Returning to block 245, if the presentation computing device 110 detects a subsequent query from an input to the presentation computing device 110, the method 200 proceeds to block 255. For example, while the user 101 is conducting the presentation, one or more members of an audience may provide feedback on the presentation, ask a question concerning the presentation, or otherwise provide a voice input comprising a query that is received by the presentation computing device 110 via the audio feed and/or video feed received by the presentation computing device 110. In an example, the presentation computing device 110 parses the input and applies voice recognition algorithms to determine words and other sounds from the input. In some examples, the presentation computing device 110 applies grammar and syntax rules to determine queries comprising groups of one or more words or sounds that indicate a query is intended. In another example, the presentation computing device 110 continues to record or receive an audio feed and/or video feed and to transmit the received audio feed and/or video feed to the context determination system 140 via the network 120. In this other example, the context determination system 140 receives the audio feed and/or video feed from the presentation computing device 110 via the network 120. In an example, the context determination system 140 parses the received audio feed and/or video feed and applies voice recognition algorithms to determine words and other sounds from the audio feed and/or video feed. In this other example, the context determination system 140 applies grammar and syntax rules to determine queries comprising groups of one or more words or sounds that indicate a query is intended.

In block 255, the presentation computing device 110 determines that the detected subsequent query corresponds to the current context or that the detected subsequent query does not correspond to the current context. In an example, the presentation computing device 110 determines a context for the subsequent query based on what was displayed at the time the input comprising the subsequent query was received at the presentation computing device 110. For example, the subject of a presentation is storms, the presentation is currently displaying a slide about hurricanes, and a sound input comprising a subsequent query "what is the average extent of damage for a category 5?" is received. The presentation computing device 110 detects the received subsequent query and determines that the context for the received subsequent query is hurricanes based on the displayed slide describing hurricanes. In an example, the presentation computing device 110 determines a full subsequent query based on the determined context and the detected subsequent query. For example, the presentation is currently displaying a slide about hurricanes and the query "what is the average extent of damage for a category 5?" is received. The presentation computing device 110 determines a full subsequent query comprising "what is the average extend of damage resulting from a category 5 hurricane?" based on the determined subsequent query and the determined context.

In another example, in which the context determination system 140 detects a query from audio feed and/or video feed received from the presentation computing device 110 via the network 120, the context determination system 140 determines a current context for the detected subsequent query. In an example, the context determination system 140 determines the current context based on what was displayed at the time the input comprising the subsequent query was received at the presentation computing device 110. For example, the context determination system 140 receives, along with the audio feed and/or video feed from the presentation computing device 110 via the network 120, display data comprising what is currently displayed via the presentation computing device 110. In another example, the context determination system 140 receives, in addition to the display data, a file comprising the presentation being displayed via the presentation computing device 110. Other data may be received by the context determination system 140 via the network 120 from the presentation computing device 110, for example, location data or other data determined or logged by the presentation computing device 110. In an example, the subject of a presentation is storms, the presentation computing device 110 is currently displaying a slide about hurricanes, and a sound input comprising a subsequent query "what is the average extent of damage?" is received by the presentation computing device 110 and transmitted by the presentation computing device 110 to the context determination system 140 via the network 120 in an audio feed along with display data comprising the slide currently displayed via the user interface 111 of the presentation computing device 110. The context determination system 140 detects the received subsequent query from the received audio feed and determines that the context for the received subsequent query is hurricanes based on the displayed slide describing hurricanes. In an example, the context determination system 140 determines a full subsequent query based on the determined context and the detected subsequent query. For example, the presentation is currently displaying a slide about hurricanes and the query "what is the average extent of damage for a category 5?" is received. The context determination system 140 determines a full subsequent query comprising "what is the average extent of damage resulting from a category 5 hurricane?" based on the determined subsequent query and the determined context.

If the presentation computing device 110 determines that the detected subsequent query corresponds to the current context, the method 200 returns to block 240. For example, the determined context for the previous query was "hurricanes," the determined subsequent query comprises "what is the average extent of damage for a category 5?" and the determined full subsequent query comprises "what is the average extent of damage resulting from a category 5 hurricane?" Based on the subsequent query and/or the full subsequent query, the presentation computing device 110 and/or the context determination system 140 determines that the context of the subsequent query comprises "hurricanes." The presentation computing device 110 and/or the context determination system 140 determines that the context for the subsequent query, "hurricanes," corresponds to the context for the previous query, "hurricanes."

In block 240, the presentation computing device 110 modifies a display of the presentation based on the detected subsequent query and the current context. For example, the presentation computing device 110 and/or the context determination system 140 determines that the context for the subsequent query corresponds to the context for the previous query. In an example, the presentation computing device 110 determines information responsive to the subsequent query based on the current context. In an example, the information responsive to the subsequent query comprises information stored on the presentation computing device 110. In another example, the information responsive to the subsequent query is obtained from a storage device accessible via a network 120 by the presentation computing device 110. In yet another example, the presentation computing device 110 submits the determined subsequent query to a search system for information responsive to the subsequent query via the network 120 and receives information via the network 120 from the search system. The search system, in response to receiving the subsequent query, determines information responsive to the full subsequent query, and in response to the subsequent query, transmits the responsive information to the presentation computing device 110 via the network 120. For example, the presentation computing device 110 submits a search query comprising "damage from category 5 hurricane" based on the detected subsequent query "what is the average extent of damage from a category 5" and the current context of "hurricanes." The search system receives via the network 120 the search query from the presentation computing device 110, finds responsive information, and transmits, via the network 120, the responsive information to the presentation computing device 110.

In another example, the context determination system 140 determines information responsive to the subsequent query. In an example, the information responsive to the subsequent query comprises information stored on a data storage unit 145 of the context determination system 140. In another example, the information responsive to the full subsequent query is obtained from a storage device accessible via a network 120 by the context determination system 140. In yet another example, the context determination system 140 submits a determined subsequent query to a search system 130 for information responsive to the subsequent query via the network 120 and receives information via the network 120 from the search system 130. The search system 130, in response to receiving the subsequent query, determines information responsive to the subsequent query, and in response to the subsequent query, transmits the responsive information to the context determination system 140 via the network 120. The context determination system 140 receives the responsive information via the network 120 and transmits the responsive information to the presentation computing device 110 via the network 120. The presentation computing device 110 receives the responsive information via the network 120 from the context determination system 140. In other examples, the context determination system 140 receives the responsive information via the network 120 from the search system 130 and does not transmit the responsive information to the presentation computing device 110. For example, the context determination system 140 submits a search query to the search system 130 comprising "damage from category 5 hurricane" based on the detected subsequent query "what is the average extent of damage from a category 5" and the current context of "hurricanes. The search system receives via the network 120 the search query from the context determination system 140, finds responsive information, and transmits, via the network 120, the responsive information to the context determination system 140. The context determination system 140 transmits the received responsive information to the presentation computing device 110 via the network 120.

Returning to block 255, if the presentation computing device 110 determines that the detected subsequent query does not correspond to the current context, the method 200 proceeds to block 260. For example, the determined context for the previous query was "hurricanes," the determined subsequent query comprises "what about the wind speed for tornados?" Based on the subsequent query and/or a full subsequent query, the presentation computing device 110 and/or the context determination system 140 determines that the context of the subsequent query comprises "tornados." The presentation computing device 110 and/or the context determination system 140 determines that the context for the subsequent query, "tornados," does not correspond to the context for the previous query, "hurricanes."

In block 260, the presentation computing device 110 determines that the detected subsequent query corresponds to a prior context or that the detected subsequent query does not correspond to a prior context.

If the presentation computing device 110 determines that the detected subsequent query does not correspond to a prior context, the method 200 proceeds to block 265. For example, the determined context for a first query was "hurricanes" and a determined second (and subsequent) query comprises "what about the wind speed for tornados?" Based on the second query, the presentation computing device 110 and/or the context determination system 140 determines that the context of the second query comprises "tornados." The presentation computing device 110 and/or the context determination system 140 determines that the context for the second query, "tornados," does not correspond to the context for the first query, "hurricanes." No prior contexts other than "hurricanes" exists and therefore the presentation computing device 110 and/or the context determination system 140 determines that the detected subsequent query does not correspond to a prior context.

In block 265, the presentation computing device determines a new context for the subsequent query and modifies a display of the presentation. For example, the presentation computing device 110 and/or the context determination system 140 determines that the context for the second query, "tornados," does not correspond to the context for the first query, "hurricanes." The presentation computing device 110 and/or the context determination system 140 determines that "tornados" comprises a new context. In an example, the presentation computing device 110 determines information responsive to the subsequent query based on the current context. In an example, the information responsive to the subsequent query comprises information stored on the presentation computing device 110. In another example, the information responsive to the subsequent query is obtained from a storage device accessible via a network 120 by the presentation computing device 110. In yet another example, the presentation computing device 110 submits the determined subsequent query to a search system for information responsive to the subsequent query via the network 120 and receives information via the network 120 from the search system. The search system, in response to receiving the subsequent query, determines information responsive to the full subsequent query, and in response to the subsequent query, transmits the responsive information to the presentation computing device 110 via the network 120. For example, the presentation computing device 110 submits a search query comprising "wind speed for a tornado" based on the detected subsequent query "what is the average wind speed of a tornado" and the determined new context of "tornados." The search system receives via the network 120 the search query from the presentation computing device 110, finds responsive information, and transmits, via the network 120, the responsive information to the presentation computing device 110.

In another example, the context determination system 140 determines information responsive to the subsequent query. In an example, the information responsive to the subsequent query comprises information stored on a data storage unit 145 of the context determination system 140. In another example, the information responsive to the full subsequent query is obtained from a storage device accessible via a network 120 by the context determination system 140. In yet another example, the context determination system 140 submits a determined subsequent query to a search system 130 for information responsive to the subsequent query via the network 120 and receives information via the network 120 from the search system 130. The search system 130, in response to receiving the subsequent query, determines information responsive to the subsequent query, and in response to the subsequent query, transmits the responsive information to the context determination system 140 via the network 120. The context determination system 140 receives the responsive information via the network 120 and transmits the responsive information to the presentation computing device 110 via the network 120. The presentation computing device 110 receives the responsive information via the network 120 from the context determination system 140. In other examples, the context determination system 140 receives the responsive information via the network 120 from the search system 130 and does not transmit the responsive information to the presentation computing device 110. For example, the context determination system 140 submits a search query to the search system 130 comprising "what is the average wind speed of a tornado" based on the detected subsequent query "what about the wind speed of a tornado" and the new context of "tornados." The search system receives via the network 120 the search query from the context determination system 140, finds responsive information, and transmits, via the network 120, the responsive information to the context determination system 140.

The context determination system 140 transmits the received responsive information to the presentation computing device 110 via the network 120.

In block 270, the presentation computing device sets the new context as the current context. In an example, the presentation computing device 110 sets the new context as the current context and adds the prior current context to the list of prior contexts. In certain examples, the presentation computing device 110 and/or the context determination system 140 does not set the determined new context as the current context until a threshold number of successive queries determined to correspond to the new context are received, for example, three successive queries corresponding to the new context.

Returning to block 260, if the presentation computing device 110 determines that the detected subsequent query corresponds to a prior context, the method 200 proceeds to block 280. For example, the presentation computing device 110 and/or the context determination system 140 determines that the context for a second query, "tornados," does not correspond to current context, "hurricanes." The presentation computing device 110 and/or the context determination system 140 extracts a list of prior contexts and determines that "tornados" corresponds to a prior context.

In block 280, the presentation computing device 110 determines a particular prior context relevant to the subsequent query and modifies a display of the presentation. For example, the presentation computing device 110 modifies the display of the presentation based on the subsequent query and the determined particular prior context. In an example, the presentation computing device 110 determines information responsive to the subsequent query based on the determined prior context. In an example, the information responsive to the subsequent query comprises information stored on the presentation computing device 110. In another example, the information responsive to the subsequent query is obtained from a storage device accessible via a network 120 by the presentation computing device 110. In yet another example, the presentation computing device 110 submits the determined subsequent query to a search system for information responsive to the subsequent query via the network 120 and receives information via the network 120 from the search system. The search system, in response to receiving the subsequent query, determines information responsive to the full subsequent query, and in response to the subsequent query, transmits the responsive information to the presentation computing device 110 via the network 120. For example, the presentation computing device 110 submits a search query comprising "wind speed for a tornado" based on the detected subsequent query "what is the average wind speed of a tornado" and the determined new context of "tornados." The search system receives via the network 120 the search query from the presentation computing device 110, finds responsive information, and transmits, via the network 120, the responsive information to the presentation computing device 110.

In another example, the context determination system 140 determines information responsive to the subsequent query. In an example, the information responsive to the subsequent query comprises information stored on a data storage unit 145 of the context determination system 140. In another example, the information responsive to the full subsequent query is obtained from a storage device accessible via a network 120 by the context determination system 140. In yet another example, the context determination system 140 submits a determined subsequent query to a search system 130 for information responsive to the subsequent query via the network 120 and receives information via the network 120 from the search system 130. The search system 130, in response to receiving the subsequent query, determines information responsive to the subsequent query, and in response to the subsequent query, transmits the responsive information to the context determination system 140 via the network 120. The context determination system 140 receives the responsive information via the network 120 and transmits the responsive information to the presentation computing device 110 via the network 120. The presentation computing device 110 receives the responsive information via the network 120 from the context determination system 140. In other examples, the context determination system 140 receives the responsive information via the network 120 from the search system 130 and does not transmit the responsive information to the presentation computing device 110. For example, the context determination system 140 submits a search query to the search system 130 comprising "what is the average wind speed of a tornado" based on the detected subsequent query "what about the wind speed of a tornado" and the new context of "tornados." The search system receives via the network 120 the search query from the context determination system 140, finds responsive information, and transmits, via the network 120, the responsive information to the context determination system 140. The context determination system 140 transmits the received responsive information to the presentation computing device 110 via the network 120.

In block 290, the presentation computing device 110 sets the determined prior context as the current context. For example, the presentation computing device 110 and/or the context determination system 140 sets the determined prior context as being the current context. In certain examples, the presentation computing device 110 does not set the determined prior context as the current context. In certain other examples, the presentation computing device 110 and/or the context determination system 140 sets the determined prior context as the current context in response to receiving a threshold number of successive queries corresponding to the prior context.

From block 290, the method 200 returns to block 245, and the presentation computing device 110 determines whether a subsequent query is received via an input to the presentation computing device 110 during the presentation. For example, while the user 101 is conducting the presentation, one or more members of an audience may provide feedback on the presentation, ask a question concerning the presentation, or otherwise provide a voice input comprising a query that is received by the presentation computing device 110 via the audio feed and/or video feed received by the presentation computing device 110. In an example, the presentation computing device 110 parses the input and applies voice recognition algorithms to determine words and other sounds from the input. In some examples, the presentation computing device 110 applies grammar and syntax rules to determine queries comprising groups of one or more words or sounds that indicate a query is intended. In another example, the presentation computing device 110 continues to record or receive an audio feed and/or video feed and to transmit the received audio feed and/or video feed to the context determination system 140 via the network 120. In this other example, the context determination system 140 receives the audio feed and/or video feed from the presentation computing device 110 via the network 120. In an example, the context determination system 140 parses the received audio feed and/or video feed and applies voice recognition algorithms to determine words and other sounds from the audio feed and/or video feed. In this other example, the context determination system 140 applies grammar and syntax rules to determine queries comprising groups of one or more words or sounds that indicate a query is intended.

Figure 3:
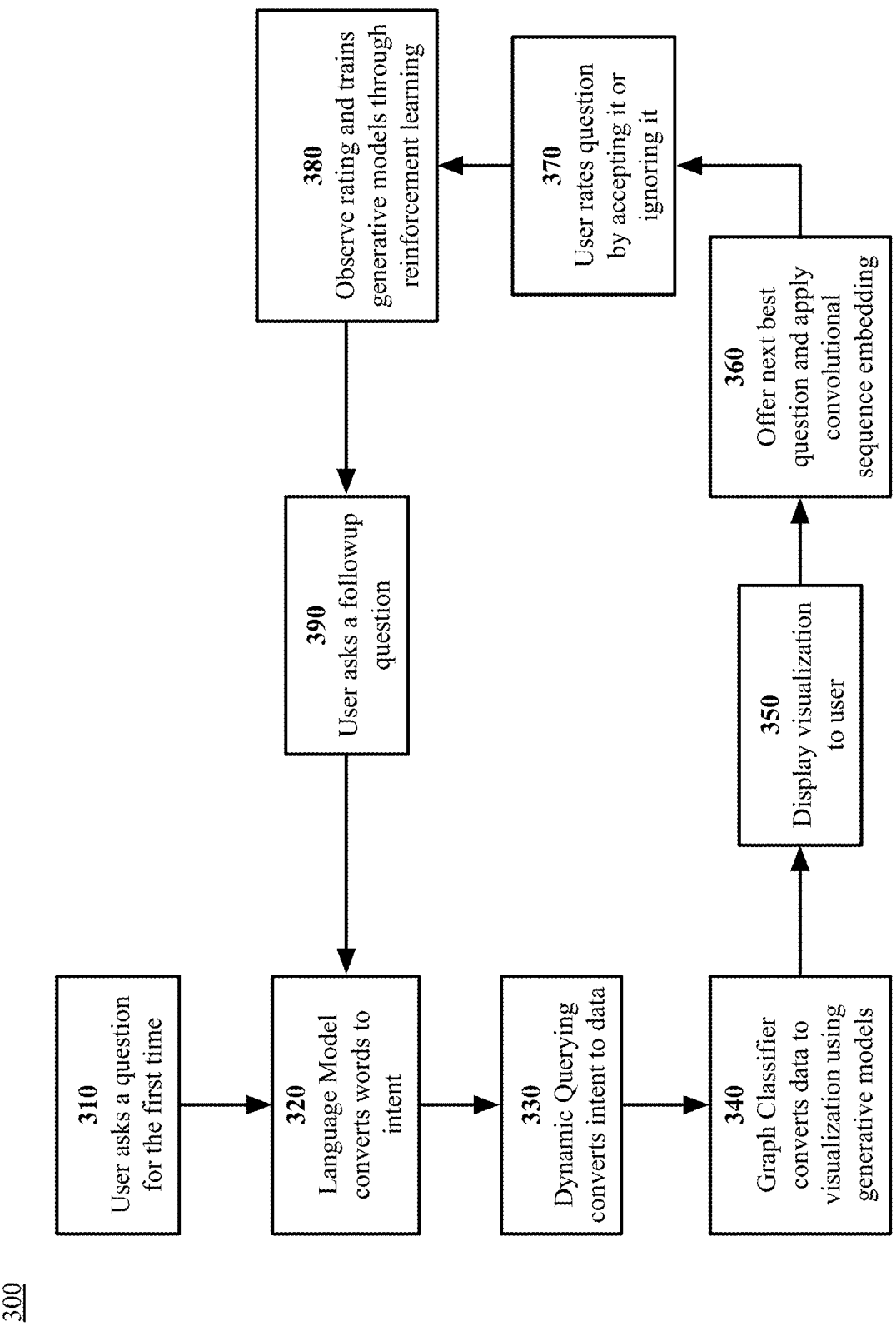
FIG. 3 is a block flow diagram describing an end to end graph visualization system, in accordance with certain examples.

FIG. 3 is a block flow diagram describing an end to end graph visualization system, in accordance with certain examples. As illustrated in FIG. 3, a workflow 300 works in the following order. First, in block 310, a user 101 asks a question for the first time and the context determination system 140 receives the question from the presentation computing device 110. In block 320, a language model of the context determination system 140 detects user intent (keywords) from user 101 voice inputs according to a dynamic, recursive context. In block 330, the context determination system 140 applies dynamic querying converts keywords into a query language. In block 340, a graph classifier of the context determination system 140 converts data into visualization to display via the presentation computing device 110 in block 350. Further, the presentation computing device 110 may receive further user 101 voice inputs or may, as in example block 360, generate one or more suggested inputs ("Next Best Question") for presentation to the user 101 via the presentation computing device 110. In certain examples, in block 370, the presentation computing device 110 may receive an input via the user interface of the presentation computing device 110 indicating that the user is satisfied or unsatisfied with one or more of the one or more suggested inputs. In other examples, the presentation computing device 110 may receive an input via the user interface 111 indicating that the user 101 is satisfied or unsatisfied with the visualization displayed in response to one or more user 101 voice inputs. In block 380, the context determination system 140 observes the received rating and trains generative models through reinforcement learning to improve responses to future queries. In an example, a graph classifier uses generative models to determine a visualization technique based on the underlying patterns in the data in a particular context during a presentation. In block 390, the user 101 asks a follow-up question and the context determination system 140 updates the visualization substantially according to the method described in blocks 320-380 as discussed previously.

The goal of a dynamic, recursive context is to extend context lifespan dynamically based on user requests in a conversation. For example, every conversation has a context. In a typical conversation, a context is associated with a lifespan, which is the number of follow-up questions that a user 101 can ask in relation to an original question. Traditional conversational software offers context lifespan to be set as a numeric parameter. They expect the designer of the conversational interface to know how long a context will likely last. For example, with conventional conversational software, contexts have a default lifespan of two requests. In certain examples in conventional systems, intents that renew the context will reset the counter and clock to give an additional five requests and ten minutes. This conventional approach works in "happy scenarios", such as when the conversation is flowing linearly and the user 101 gets what he wants in a few tries. A challenge of determining a context in a real world conversation is that real conversations meander, and it's hard to find an optimal context lifespan and preset it into an intent. A parameterized approach can make the conversation unpredictable after a few requests. For example, if the parameter set too low, the initial context is forgotten within just a few interactions and if the parameter set too high, an irrelevant context is maintained that the user no longer cares about.

Figure 4:
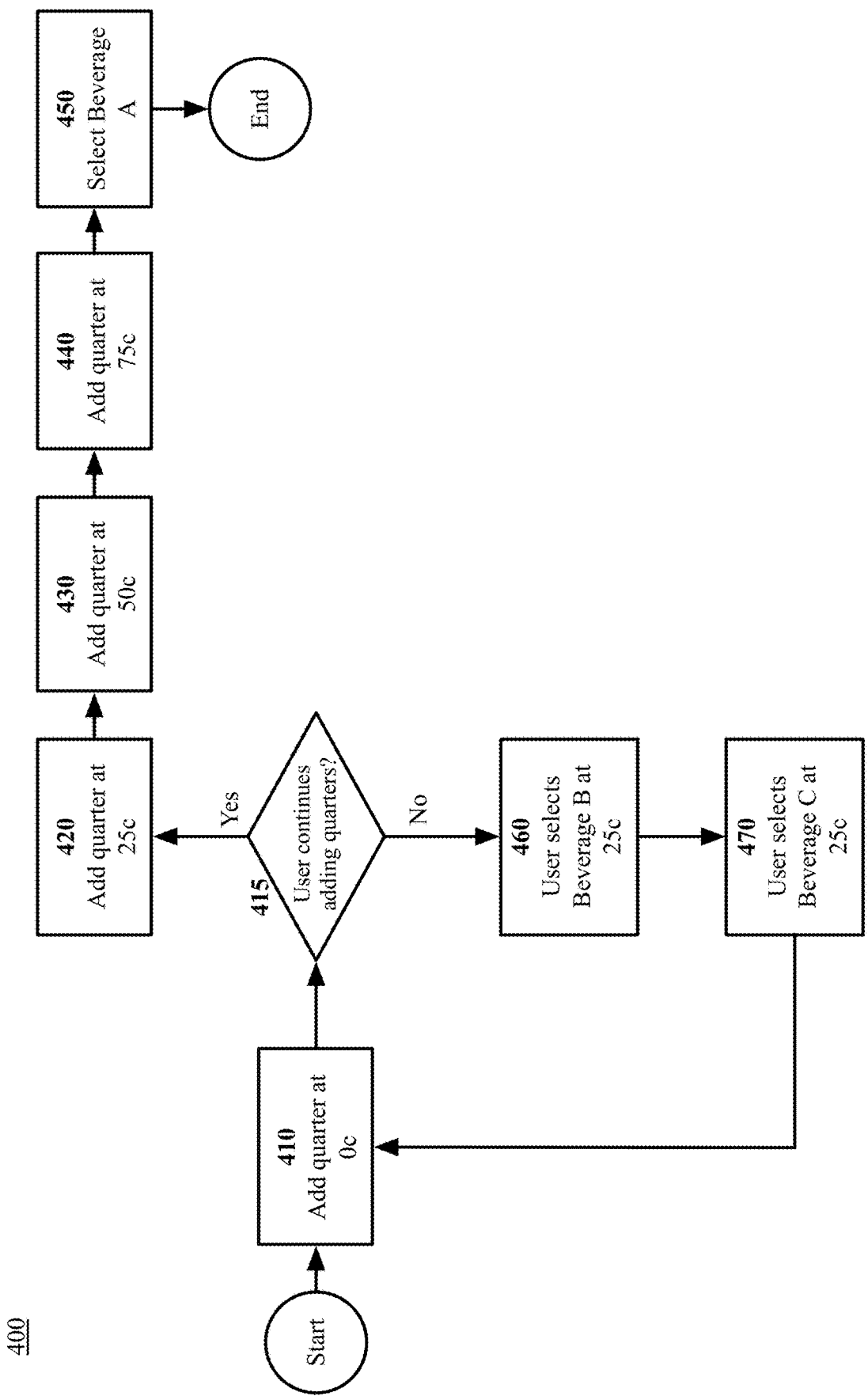
FIG. 4 is a block flow diagram illustrating an example inadequacy of conventional systems, which set fixed lifespan parameters for context determination, in accordance with certain examples.

FIG. 4 is a block flow diagram illustrating an example inadequacy of conventional systems, which set fixed lifespan parameters for context determination, in accordance with certain examples. The user 101 is penalized for inputting the wrong sequence of inputs when the context lifespan parameter is fixed. In FIG. 4, in a purchase flow 400, a user 101 attempts to purchase Beverage A at a vending machine with a context lifespan parameter set at two. At block 410, the user 101 adds a quarter. In the general flow, at block 415 the user decides to add three more quarters successively in blocks 420, 430, and 440, which presents no problem. In response to receiving the fourth quarter in block 440 and receiving the user's 101 selection of a beverage in block 450, the vending machine outputs Beverage A. However, in an alternative flow, the user 101 is penalized for inputting too many irrelevant inputs, exceeding the context lifespan parameter of two. The user 101, in this alternative flow, adds a first quarter at block 410, but then inputs a selection of Beverage B at block 460 and a subsequent selection of Beverage C at block 470. For example, the user inputs two successive questions, "do you have Beverage B?" and "do you have soda C?" Because the context lifespan parameter is set at two, after the second input or question is received by the vending machine, the vending machine resets and the vending machine forgets that the user 101 added the first quarter at block 410. Consequently, the user 101 must add four more quarters to purchase a beverage at the vending machine.

To counter this problem that exists in conventional systems, the context determination system 140 and/or presentation computing device 110 provides a "Recursive Context" that keeps or discards context based on user 101 interactions. In an example, a context comprises an input of a user 101 (or other audience member listening to or viewing the presentation being given by the user 101) or a current portion of a presentation or other content being displayed via a presentation computing device 110. In an example, a presentation computing device 110 displaying a presentation receives follow-up questions during a presentation or receives other inputs of one or more users. In an example, the context may comprise one or more previous inputs of the user 110. In an example, a lifespan of the context is set to only one interaction, with context being refreshed by each subsequent question that is related to the previous one or more questions. This allows users 101 to ask questions indefinitely without context expiring at an arbitrary point. Context is only reset if users 101 ask a new question that is not related to one or more previous questions instead of refining their previous question. This is supplemented by backend memory that stores parameters from previous questions and guards against parameters overwriting themselves. For the example stated above, the proposed solution remembers original context regardless of the sequence in which user conversation flows.

For example, a presentation computing device 110 displays a slide presentation concerning a homicide rate in country A over the past ten years. In an example, the presentation computing device 110 receives a first voice input of a user asking "please show statistics from state/territory B only." In response to receiving the first voice input, the presentation device determines that the first voice input relates to the a context of the presentation display and, in response to determining that the first voice input is related to the context, displays the homicide rate relating only to state/territory B, country A over the past ten years. In certain examples, the presentation computing device 110, in response to the first voice input, revises the display using data available to the presentation computing device 110 to display the homicide rate relating only to state/territory B, country A over the past ten years. In other examples, the presentation computing device 110 transmits a search request to a search system or a server over a network with a search query requesting the homicide rate from state/territory B, country A over the last ten years and receiving the requested homicide rate. In an example, the presentation device receives a second voice input of the user asking "please show me the past three years only." In response to receiving the second voice input, the presentation computing device 110 determines that the second voice input relates to the context and, in response to determining that the second voice input is related to the context, displays the homicide rate relating only to state/territory B, country A over the past three years. In certain examples, the presentation computing device 110, in response to the second voice input, revises the display using data available to the presentation computing device 110 to display the homicide rate relating only to state/territory B, country A over the past three years. In other examples, the presentation computing device 110 transmits a search request to a search system or a server over a network with a search query requesting the homicide rate from state/territory B, country A over the last three years and receiving the requested homicide rate. In an example, the presentation computing device 110 receives a third voice input of a user 101 saying "enough about that topic." In response to receiving the third voice input, the presentation computing device 110 determines that the input is unrelated to the current context and, in response to determining that the input is unrelated to the current context, transitions to the subsequent slide in the presentation and resets the context based on the content in the subsequent slide.

In certain examples, the presentation device stores a previous context and may revive the previous context if the user 101 abandons the previous context for a subsequent context and then provides one or more inputs to the presentation computing device 110 concerning the previous context. For example, a first, previous context is a homicide rate in country X and a second, current context is an income distribution of country X. The presentation computing device 110 receives a voice input of the user comprising "oh, I forgot to mention something about the homicide rates" or "do you remember what we discussed about the homicide rate?" The presentation computing device 110 determines, in response to receiving a voice input that is related to a first previous context, that the user intends to return to first previous context and displays information related to the first previous context based on the content of the voice input. The presentation computing device 110 stores the second context and may display information relating to the second context in response to receiving a subsequent user 101 voice input such as "ok, returning to our discussion of economics".

The goal of the Next Best Question feature, provided by the context determination system 140 and/or the presentation computing device 110, is to enable users 101 to ask the most meaningful sequence of questions from data. A successful data exploration starts with asking the right series of questions. The problem with prebuilt visualizations, often used in conventional technology, is that it forces the users think about a subject in a linear, predetermined hierarchy. That implies only a predetermined set of questions could be answered, in a predetermined sequence. An example meaningful dialogue involves long term preferences, recently asked questions, and answer to the last question. To fulfill this need, the presentation computing device may apply, for example the algorithm for TopN Sequential Recommendation algorithm via Convolutional Sequence Embedding as described at: http://www.sfu.ca/~jiaxit/resources/wsdm18caser.pdf. Traditional recommender systems, e.g., top N recommendation systems, recommend the items based on the user's 101 general, long-term preferences without paying attention to the recentness of items.

For example, the following is an example superstore dataset:

|   | SALES | REGION | PRODUCT |
|---|---|---|---|
| 1 | $400,000 | North | Office Supplies |
| 2 | $350,000 | South | Technology |
| 3 | $700,000 | East | Furniture |
| 4 | $400,000 | North | Office Supplies |
| 5 | $350,000 | South | Technology |
| 6 | $700,000 | East | Furniture |
| 7 | $600,000 | West | Books |

Figure 5:
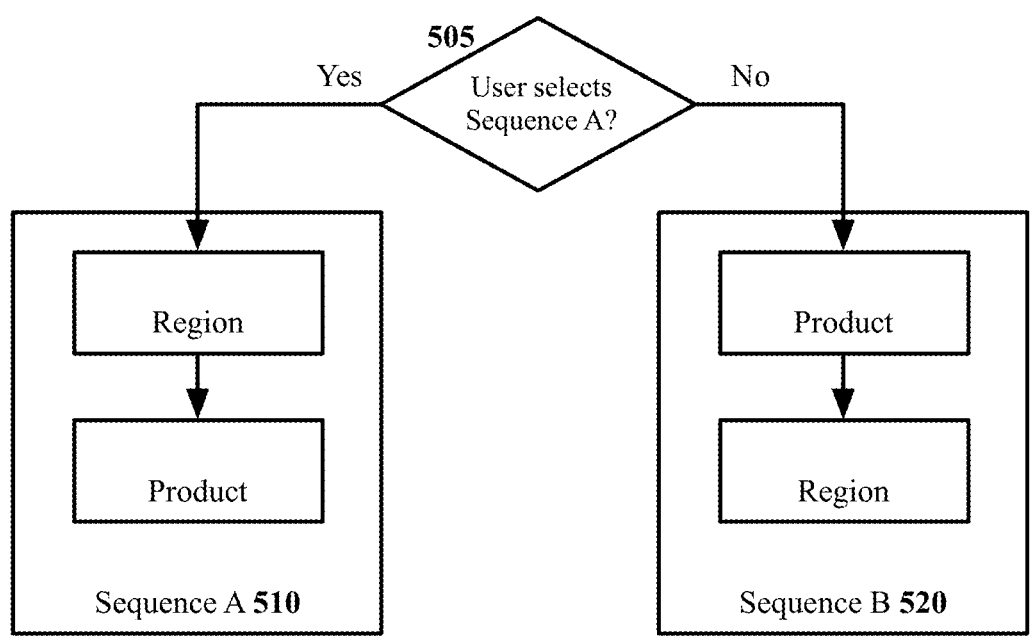
FIG. 5 is an example illustration of two ways of analyzing a dataset, in accordance with certain examples.

In this example, for two categories, there are two sequences possible. For example, FIG. 5 is an example illustration 500 of two methods of looking at an example data set. As illustrated in FIG. 5, in block 505, a user may select either Sequence A 510 or Sequence B 520. In Sequence A 510, the hierarchy of the sequence comprises the category of "Region" followed by the category of "Product." In Sequence B 520, the hierarchy of the sequence comprises the category of "Product" followed by the category of "Region." For three categories, however, there are six sequences possible. For four categories, there are 24 sequences possible. Thus, the number of combinations quickly grows to n! (nfactorial) for ndimensional space. So anytime the number of dimensions exceeds three, the complexity of pre-creating the combinations rises exponentially.

Figure 6:
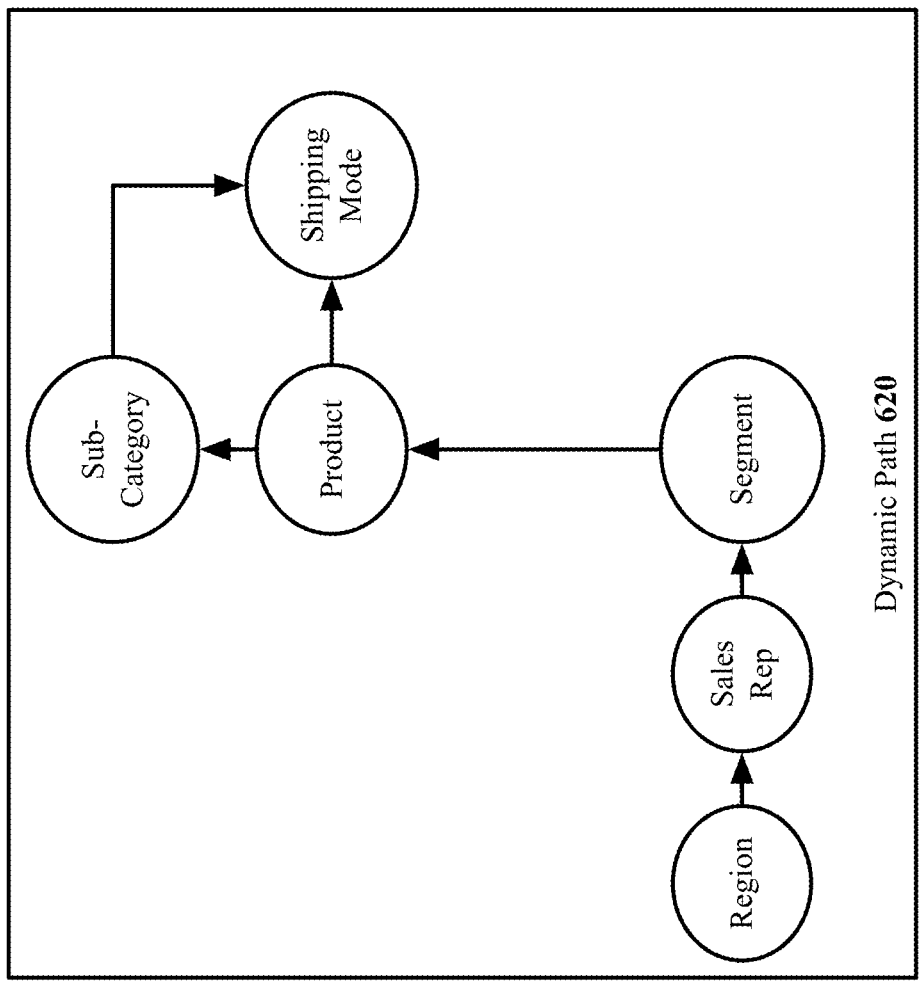
FIG. 6 is an example illustration showing how the data needs of different user groups could be very different from each other, in accordance with certain examples.
Figure 6:
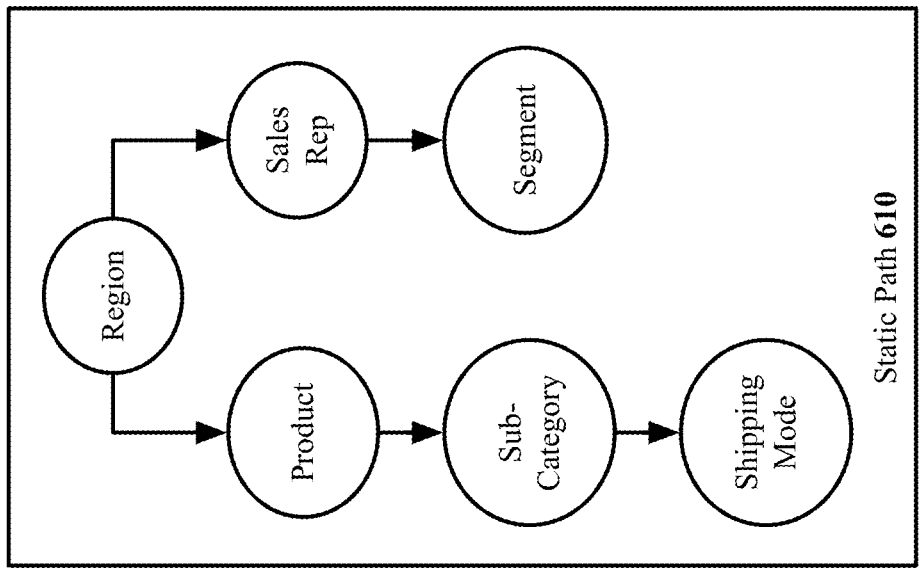

FIG. 6 is an example illustration 600 showing how the data needs of different user groups could be very different from each other, in accordance with certain examples. However, boxing users in a single dashboard might help a certain user group but could be very limiting for others. For example, in Static Path 610, a user 101 analyzes data by first looking at a "Region" category, followed either by a hierarchy of "Product," "Sub-category," and "Shipping Mode" or "Sales Rep" and "Segment." In another example, in Dynamic Path 620, the user 101 analyzes a data set by first looking at "Region," followed by a hierarchy of "Sales Rep," "Segment," and "Product," following directly to "Shipping Mode" or either "Sub-Category" then "Shipping Mode."

Figure 7:
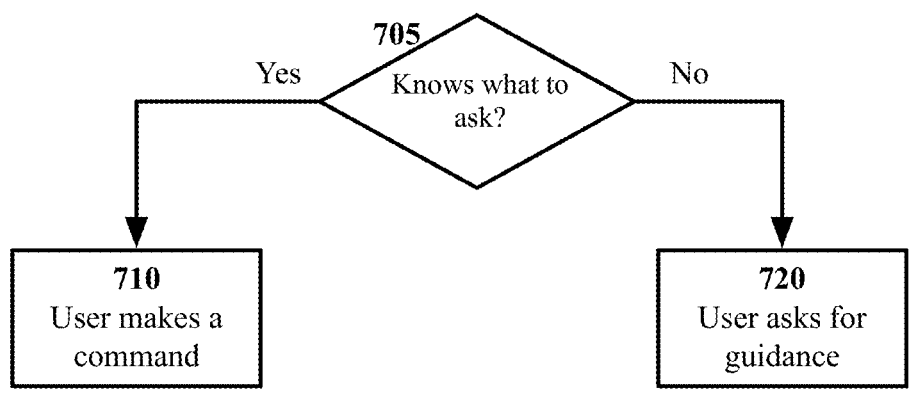
FIG. 7 is an illustration of example scenarios for building successive data visualizations, in accordance with certain examples.

Next Best Question provides a flexible approach for building successive data visualizations that could be triggered by one of the following scenarios. FIG. 7 is an example illustration 700 of example scenarios for building successive data visualizations, in accordance with certain examples. In block 705, the user 101 either knows or does not know what to ask. In block 710, if the user knows what to ask, user can make a command. For example, the user 101 specifies what next drill down of data s/he wishes to see in relation to an existing data visualization. The new view will be tailored to user's explicit request based on prior context and new intent expressed by the user. In block 720, however, in an example in which the user does not know what to ask, the user 101 asks for guidance. The system anticipates user's needs and recommends a next best question to ask.

In the world of data exploration, the next question depends on example factors, for example, the user's general preferences, recently asked questions, an answer to the last question, and what others are asking. In an example, John is a user who occasionally attends musical concerts. And he has the following example conversation. In this example conversation, the presentation device receives John's first voice input comprising "How's the weather in San Francisco today?" and the presentation device outputs a first audio response comprising "It's cloudy at 67 F." The presentation device receives John's second voice input comprising "How will it look like over the weekend?" and the presentation device outputs a second audio response comprising "It's sunny at 72 F." The presentation device may predict a Next Best Question comprising "Show me the musical concerts in San Francisco this weekend."

Figure 8:
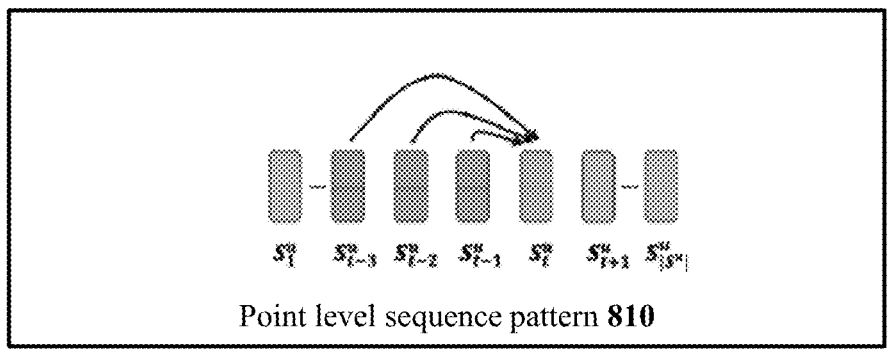
FIG. 8 is a diagram illustrating factors for a next best question, in accordance with certain examples.
Figure 8:
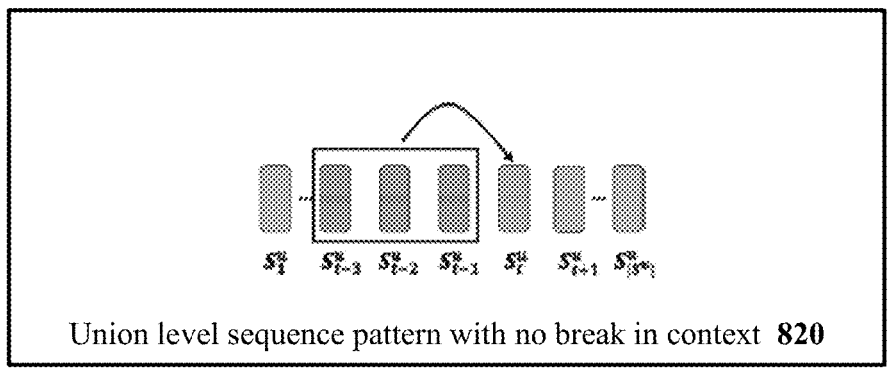
Figure 8:
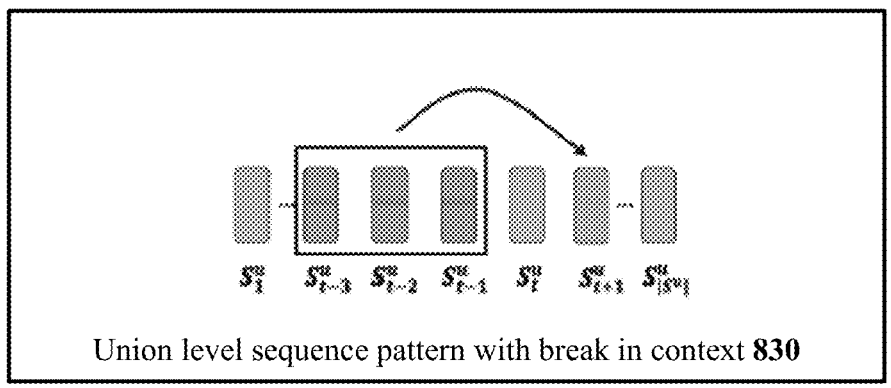

The algorithm applied by the context determination system 140 and/or presentation computing device 110, described herein, however, differs from the traditional approaches of recommendations. For example, this approach applied by the context determination system 140 and/or presentation computing device 110 provides a unified and flexible network structure for capturing many important features of sequential recommendation. FIG. 8 is an illustration 800 showing a point level sequence pattern 810, a union level sequential patterns with no break in context 820, and a union level sequence pattern with a break in context 830. For example, sequence patterns may comprise skip behaviors and long term user preferences. Further, this algorithm incorporates the Convolutional Neural Network (CNN) to learn sequential features, and Latent Factor Model (LFM) to learn user specific features.

To train the CNN, for each user (u) we extract every L successive questions as input and. their next T questions as the targets from the user's sequence S. This is done by sliding a window of size L+T over the user's sequence, and each window generates a training instance for u denoted by a triplet (u, previous L questions, next T questions). This approach enables the use of convolution filters to search for sequential patterns. Borrows the idea of using CNN in text classification, the approach regards the L×d matrix E as the "image" of the previous L items in the latent space and regard sequential patterns as local features of this "image". In an example, Next Best Question recommends N items that have the highest values in the output layer y. In an example, the CNN learns from data from a specific user 101 associated with a particular presentation computing device 110. In another example, the CNN learns from aggregated data of multiple users associated with respective presentation computing devices 110. In yet another example, the CNN learns from data both from a specific user and from the aggregated data of multiple users.

Different data characteristics require different visualization techniques for effectively studying the underlying patterns in the data. Deciding which chart to use for which data in a presentation is a hard decision for nontechnical, business users designing and presenting presentations and therefore an alternate approach is needed. With the growing advancements in data sources, volume and AI/ML Traditional approaches for hardcoding these rules is not scalable. The following drawbacks exist: For example, data is dynamic, and the rules are often too static. Further, visualizations by themselves do not explain the insights. A need exists to layer visualizations on top of each other to make better sense of data. For example, a time series graph of 5 variables can be drawn on 5 line curves but there is no annotation to explain the correlation between the peaks and valleys. Business users need those insights to make sense of data.

The context determination system 140 and/or presentation computing device 110 provides a solution by generating such overlaying visualizations dynamically at request, in context using generative models. The context determination system 140 and/or presentation computing device 110 described herein would work very well for situations where such datasets and visualizations are not pre programmed and dynamic. In fields such as internet of things ("IoT"), data is largely multidimensional. As the dimensions grow the pre-existing visualizations quickly become irrelevant.

In certain examples, the presentation computing device may display a contextual overlay of insight on a time series. A graph classifier may use an algorithm as described at: https://arxiv.org/pdf/1804.03126.pdf. This algorithm involves Generative Models that are composed of encoder-decoder layers of recurrent neural networks (RNNs). Generative models help by deciding what chart to use, evolving as the data evolves in volume and in dimensionality, and adding layers on existing visualization to help make sense of data. In certain examples, the presentation computing device 130, using the generative models determines that a region of a displayed graph is statistically significant and displays, in response to that determination, a close up view of the statistically significant portion of the graph as an overlay over the current presentation slide displaying the graph. In an example, the generative models are based on data from a specific user, from aggregated data of multiple users, or from a combination of data from both a specific user and aggregated data of multiple users.

In an example, in response to receiving a voice input, the presentation computing device 110 determines that the user 101 is looking for additional information concerning a context. The presentation computing device 110 generates a search query and transmits the search query to a search system 130 via a network 120 and receives search results via the network 120 from the search system 130 in response to the search query. The search system 130 retrieves one or more search results in response to receiving the search query via the network 120 and transmits the retrieved one or more search results to the presentation computing device 110 via the network 120. The presentation computing device 110 selects one or more images, text, videos, or other data from the one or more received search results and annotates the presentation with the one or more selected data.

OTHER EXAMPLES

Figure 9:
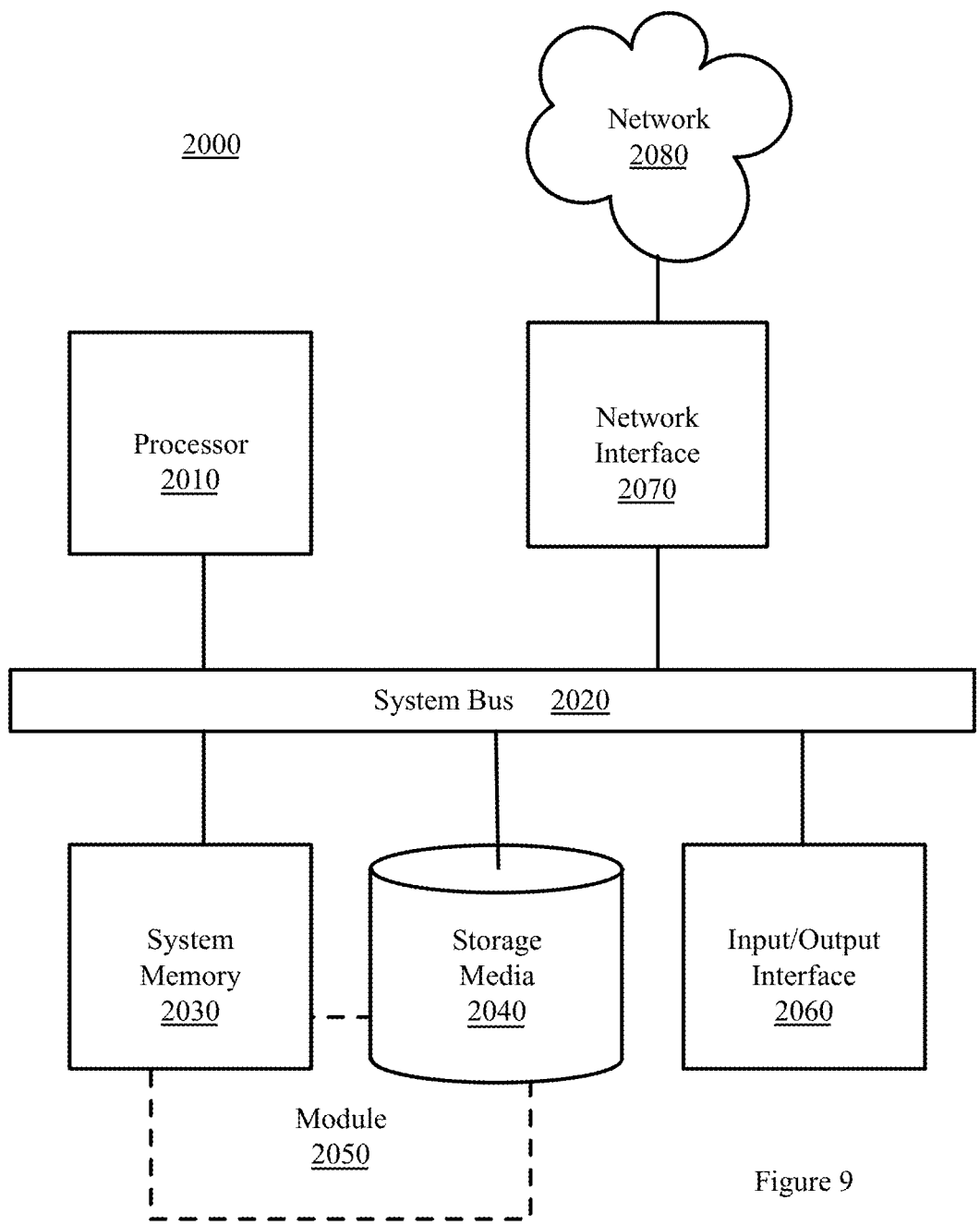
FIG. 9 is a block diagram depicting a computing machine and a module, in accordance with certain examples.

FIG. 9 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system to dynamically update presentations based on context classification of voice inputs, comprising:
    a storage device; and
    a processor communicatively coupled to the storage device, wherein the processor executes application code instructions that are stored in the storage device to cause the system to:
        display a first graphical user interface associated with a first context via a user interface;
        obtain a first voice input;
        determine one or more first terms from the first voice input;
        determine that the first voice input is related to a first context based on the one or more first terms;
        in response to determining that the first voice input is related to the first context:
            modify the first graphical user interface associated with the first context; and
            display the modified first graphical user interface associated with the first context via the user interface;
        obtain a second voice input;
        determine one or more second terms from the second voice input;
        determine that the second voice input is unrelated to the first context based on the one or more second terms;
        in response to determining that the second voice in put is unrelated to the first context:
            generate a second context based on the one or more second terms from the second voice input; and
            display a second graphical user interface associated with the second context.

2. The system of claim 1, wherein the processor is further configured to execute application code instructions stored in the storage device to cause the system to:
    obtain a third voice input;
    determine one or more third terms from the third voice input;
    determine that the third voice input is unrelated to the second context based on the one or more third terms;
    in response to determining that the third voice input is unrelated to the second context, determine that the third voice input is related to the first context based on the one or more third terms; and
    in response to determining that the third voice input is related to the first context:
        generate a third graphical user interface associated with the first context based on the one or more third terms; and
        display the third graphical user interface associated with the first context.

3. The system of claim 2, wherein the processor is further configured to execute application code instructions stored in the storage device to cause the system to:
    obtain a fourth voice input;
    determine one or more fourth terms from the fourth voice input;
    determine that the fourth voice input is related to the first context based on the one or more fourth terms; and
    in response to determining that the fourth voice input is related to the first context:
        update the modified first graphical user interface associated with the first context; and
        display the updated modified first graphical user interface associated with the first context via the user interface.

4. The system of claim 1, wherein the processor is further configured to execute application code instructions stored in the storage device to cause the system to:
    provide, to one or more computing devices, a search query comprising the one or more second terms;
    obtain, from the one or more computing devices, one or more search results; and
    annotate the first graphical user interface using information from one or more of the one or more obtained search results.

5. The system of claim 1, wherein the processor is further configured to execute application code instructions stored in the storage device to cause the system to:
    determine one or more suggested next inputs for the first context based on the one or more first terms and the one or more second terms;
    display the one or more suggested next inputs for the first context via the user interface;
    obtain a selection of a particular one of the one or more suggested next inputs;
    in response to obtaining the selection of the particular one of the one or more suggested next inputs, further modify the modified first graphical user interface; and
    display the further modified first graphical user interface via the user interface.

6. The system of claim 1, wherein the processor is further configured to execute application code instructions stored in the storage device to cause the system to:
    input the one or more first terms from the first voice input into a graph classifier to determine a graph type, wherein modifying the first graphical user interface associated with the first context comprises adding a graph to the display corresponding to the determined graph type, wherein displaying the modified first graphical user interface comprises displaying the graph.

7. The system of claim 6, wherein the graph classifier uses an algorithm comprising one or more generative models that are composed of encoder-decoder layers of recurrent neural networks (RNNs).

8. A computer-implemented method to dynamically update presentations based on context classification of voice inputs, comprising:
- displaying, using a presentation computing device, a first graphical user interface associated with a first context via a user interface;
- obtaining, using the presentation computing device, a first voice input;
- determining, using the presentation computing device, one or more first terms from the first voice input;
- determining, using the presentation computing device, that the first voice input is unrelated to the first context based on the one or more first terms;
- in response to determining that the first voice input is related to the first context:
  - inputting, using the presentation computing device, the one or more first terms from the first voice input into a graph classifier to determine a graph type; and
  - adding, using the presentation computing device, a graph to the first graphical user interface corresponding to the determined graph type;
- obtaining, using the presentation computing device, a second voice input;
- determining, using the one or more computing devices, one or more second terms from the second voice input;
- determining, using the presentation computing device, that the second voice input is unrelated to the first context based on the one or more second terms; and
- in response to determining that the second voice in put is unrelated to the first context:
  - inputting, using the presentation computing device, the one or more second terms to a generative model to determine that a region of the displayed graph is statistically significant; and
  - displaying, using the presentation computing device in response to determining the region that is statistically significant in the first graphical user interface, a close up view of the statistically significant portion of the graph as an overlay over the graph.

9. The computer-implemented method of claim 8, further comprising:
- obtaining, by the presentation computing device, a third voice input;
- determining, by the presentation computing device, one or more third terms from the third voice input;
- determining, by the presentation computing device, that the third voice input is unrelated to the first context based on the one or more third terms;
- in response to determining that the third voice input is unrelated to the first context:
  - generating, by the presentation computing device, a second context based on the one or more second terms from the second voice input; and
  - displaying, by the presentation computing device, a second graphical user interface associated with the second context.

10. The computer-implemented method of claim 8, further comprising:
- obtaining, by the presentation computing device, a third voice input;
- determining, by the presentation computing device, one or more third terms from the third voice input;
- determining, by the presentation computing device, that the third voice input is related to the first context based on the one or more third terms;
- in response to determining that the third voice input is related to the first context:
  - updating, by the presentation computing device, the modified first graphical user interface associated with the first context; and
  - displaying, by the presentation computing device, the updated modified first graphical user interface associated with the first context via the user interface.

11. The computer-implemented method of claim 8, wherein the graph classifier uses an algorithm comprising one or more generative models that are composed of encoder-decoder layers of recurrent neural networks (RNNs).

12. The computer-implemented method of claim 11, wherein the one or more generative models are based on aggregate presentation data from multiple presentation computing devices.

13. The computer-implemented method of claim 8, further comprising:
- providing, using the presentation computing device to one or more computing devices, a search query comprising the one or more second terms;
- obtaining, using the presentation computing device from the one or more computing devices, one or more search results; and
- annotating, using the presentation computing device, the first graphical user interface using information from one or more of the one or more obtained search results.

14. The computer-implemented method of claim 8, further comprising:
- determining, using the presentation computing device, one or more suggested next inputs for the first context based on the one or more first terms and the one or more second terms;
- displaying, using the presentation computing device, the one or more suggested next inputs for the first context via the user interface;
- obtaining, using the presentation computing device, a selection of a particular one of the one or more suggested next inputs;
- in response to obtaining the selection of the particular one of the one or more suggested next inputs, further modifying, using the presentation computing device, the modified first graphical user interface; and
- displaying, using the presentation computing device, the further modified first graphical user interface via the user interface.

15. A computer program product, comprising:
- a non-transitory computer-readable medium having computer-readable program instructions embodied thereon that when executed by a processor dynamically update presentations based on context classification of voice inputs, the computer-readable program instructions comprising:
  - computer-readable program instructions to display a first graphical user interface associated with a first context via a user interface;
  - computer-readable program instructions to obtain a first voice input;
  - computer-readable program instructions to determine one or more first terms from the first voice input;
  - computer-readable program instructions to determine that the first voice input is related to the first context based on the one or more first terms;
  - computer-readable program instructions to input, in response to determining that the first voice input is related to the first context, the one or more first terms from the first voice input into a graph classifier to determine a graph type;

computer-readable program instructions to add a graph to the first graphical user interface corresponding to the determined graph type;

computer-readable program instructions to obtain a second voice input;

computer-readable program instructions to determine one or more second terms from the second voice input;

computer-readable program instructions to determine that the second voice input is unrelated to the first context based on the one or more second terms;

computer-readable program instructions to input, in response to determining that the second voice input is not related to the first context, the one or more second terms to a generative model to determine that a region of the displayed graph is statistically significant; and computer-readable program instructions to display, in response to determining the region that is statistically significant in the first graphical user interface, a close up view of the statistically significant portion of the graph as an overlay over the graph.

16. The computer program product of claim 15, further comprising:

computer-readable program instructions to obtain a third voice input;

computer-readable program instructions to determine one or more third terms from the third voice input;

computer-readable program instructions to determine that the third voice input is unrelated to the first context based on the one or more third terms;

computer-readable program instructions to generate, in response to determining that the third voice input is not related to the first context, a second context based on the one or more second terms from the second voice input; and computer-readable program instructions to display a second graphical user interface associated with the second context.

17. The computer program product of claim 15, further comprising:

computer-readable program instructions to obtain a third voice input;

computer-readable program instructions to determine one or more third terms from the third voice input;

computer-readable program instructions to determine that the third voice input is related to the first context based on the one or more third terms;

computer-readable program instructions to update, in response to determining that the third voice input is related to the first context, the modified first graphical user interface associated with the first context; and computer-readable program instructions to display the updated modified first graphical user interface associated with the first context via the user interface.

18. The computer program product of claim 15, wherein the graph classifier uses an algorithm comprising one or more generative models that are composed of encoder-decoder layers of recurrent neural networks (RNNs).

19. The computer program product of claim 15, further comprising:

computer-readable program instructions to provide, to one or more computing devices, a search query comprising the one or more second terms;

computer-readable program instructions to obtain, from the one or more computing devices, one or more search results; and computer-readable program instructions to annotate the first graphical user interface using information from one or more of the one or more obtained search results.

20. The computer program product of claim 15, further comprising:

computer-readable program instructions to determine one or more suggested next inputs for the first context based on the one or more first terms and the one or more second terms;

computer-readable program instructions to display the one or more suggested next inputs for the first context via the user interface;

computer-readable program instructions to obtain a selection of a particular one of the one or more suggested next inputs;

computer-readable program instructions to update, using the presentation computing device, the modified first graphical user interface; and computer-readable program instructions to display the updated modified first graphical user interface via the user interface.

* * * * *